United States Patent [19]

Fishman et al.

[11] Patent Number: 5,646,501

[45] Date of Patent: Jul. 8, 1997

[54] FLEXIBLE POWER ARCHITECTURE WHICH SUPPORTS MULTIPLE BATTERY TECHNOLOGIES FOR USE WITH A PORTABLE DEVICE

[75] Inventors: David A. Fishman, Lakewood; John Fraterrigo, Toms River; David A. Kiley, Brick, all of N.J.

[73] Assignee: Lucent Technologies Inc., Murray Hill, N.J.

[21] Appl. No.: 551,971

[22] Filed: Nov. 2, 1995

[51] Int. Cl.[6] .......................... H01M 10/44; H01M 10/46
[52] U.S. Cl. ................................ 320/2; 320/15
[58] Field of Search ............................ 320/2, 5, 6, 15, 320/30, 39, 48, 56

[56] References Cited

U.S. PATENT DOCUMENTS 4,965,738  10/1990  Bauer et al. ...................... 320/39 X
5,200,686  4/1993  Lee ..................................... 320/2
5,206,097  4/1993  Burns et al. ...................... 320/48 X
5,298,346  3/1994  Gyenes .............................. 429/90

OTHER PUBLICATIONS

"Lithium Ion Battery," by the New Business Promotion Division of Hitachi Maxell Ltd., 1995.

*Primary Examiner*—Edward Tso
*Attorney, Agent, or Firm*—Samuel R. Williamson

[57] ABSTRACT

A portable device operable from batteries employing different cell technologies is disclosed. Through the addition of minimal circuitry, a portable device configured for operation with battery cells having a first type of technology may be configured to accommodate batteries employing alternative cell technologies. Circuitry is also associated with battery cells of the alternative battery technology for configuring output parameters of these battery cells for operation with the portable device. A single battery charger, which connects to the portable device, is usable for recharging each of the battery cell technologies through the portable device.

23 Claims, 4 Drawing Sheets

40

5,646,501

FLEXIBLE POWER ARCHITECTURE WHICH SUPPORTS MULTIPLE BATTERY TECHNOLOGIES FOR USE WITH A PORTABLE DEVICE

TECHNICAL FIELD

This invention relates to battery pack devices, and more particularly to the interchangeability of such devices when used in powering portable devices.

BACKGROUND OF THE INVENTION

The use of rechargeable batteries such as, for example, nickel-cadmium (NiCad) and nickel-metal hydride (NiMH) batteries for providing operating power in consumer products is well established. Such rechargeable batteries are frequently used in communications devices such as cellular and cordless telephones and other mobile telecommunications products. As these communications devices become more widely available and accepted, some consumers may desire different battery options for providing different operating parameters, such as longer talk and standby times. By way of example, more consumers have begun to rely on cellular radio communications as a primary form of communications. Battery life for cellular telephones has therefore become an important consideration for some consumers.

As newer and more powerful rechargeable batteries, such as lithium-ion (Li-on) batteries, become available, consumers are expected to want the option to purchase these type batteries to achieve, for example, the increased talk and standby time afforded to a portable telephone through use of these batteries. It is conceivable, therefore, that the same portable telephone may be powered at different times by different battery cell technologies. It is desirable, however, that no detrimental performance occurs in the portable telephone when receiving operating power from the different possible battery types. It is also desirable to be able to charge any of the optional battery types, which also have different charging characteristics, with a common battery recharger without any negative effects.

SUMMARY OF THE INVENTION

In accordance with the invention, a flexible architecture which supports multiple powering options for a portable device is provided.

In a first aspect of the invention, a portable device is operable from batteries employing different cell technologies. A portable device configured for operation with battery cells having a first type of technology may, through the addition of minimal interface circuitry within the device, be configured to accommodate other batteries employing alternative cell technologies. In an illustrative embodiment, the battery cells for an alternative type of battery technology are conveniently located in a battery pack which also includes interface circuitry for configuring the parameters of the battery pack for operation with the portable device.

In a second aspect of the invention, one battery charger is used for recharging each of the different battery cell technologies. Such operation is advantageously achieved through use of the interface circuitry located in the portable device and, for the alternative battery technology, also the interface circuitry located in the battery pack.

BRIEF DESCRIPTION OF THE DRAWING

This invention and its mode of operation will be more clearly understood from the following detailed description when read with the appended drawing in which.

Throughout the drawing, the same elements when shown in more than one figure are designated by the same reference numerals.

DETAILED DESCRIPTION

Figure 1:
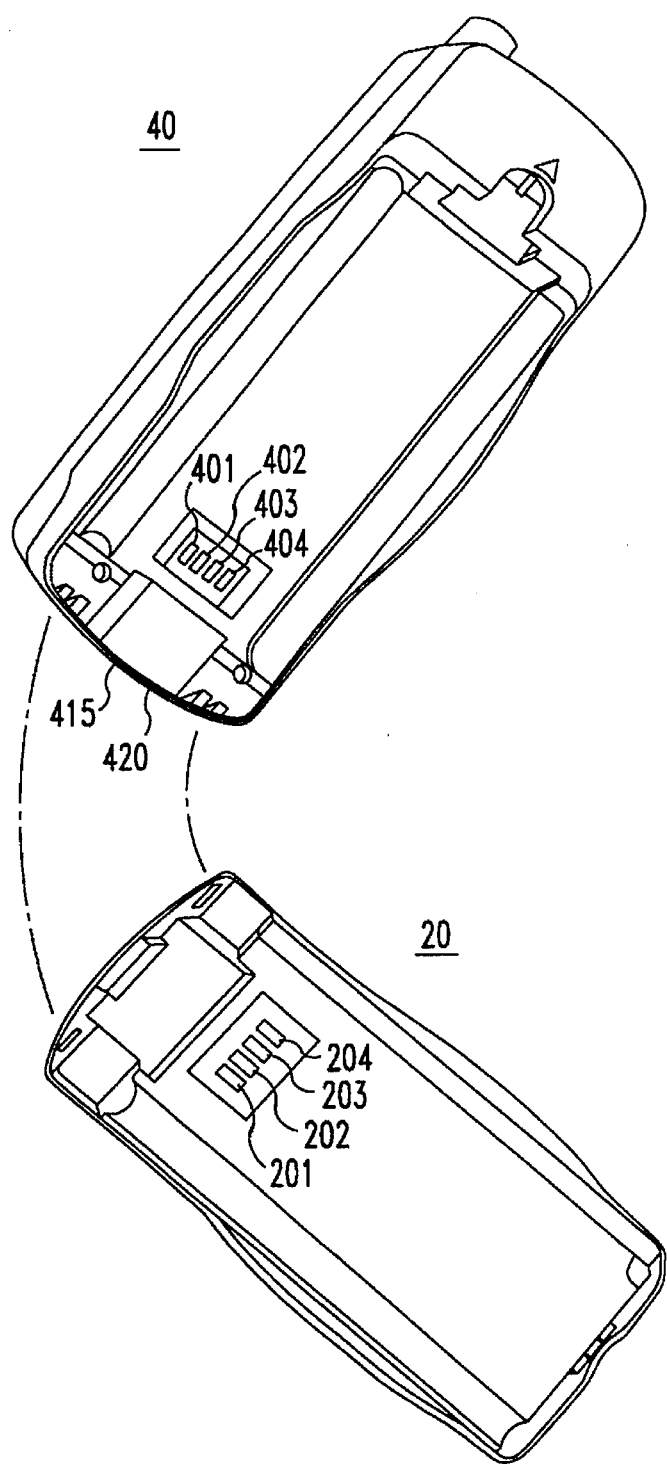
FIG. 1 shows perspective views of both a portable device such as a transceiver, and a battery pack which provides operating power to the transceiver and to which the present invention may be applied.

Referring now to FIG. 1, there is shown a perspective view of both a portable device 40, illustratively shown as a cellular transceiver, and a battery pack 20 which provides operating power for the portable device 40. The housing for the battery pack appears generally as a rectangular slab and forms a continuation of the portable device housing design and maintains the appearance of a family of similarly configured portable devices. One side of the battery pack 20 fits into a hollow recess in the portable device 40, and four electrical contacts 201 through 204 on this same side of the battery pack align with and make direct contact with four electrical contacts 401 through 404 in the hollow recess portion of the portable device 40. These electrical contacts provide the conducting paths over which operating power from the battery pack is provided to the portable device. Power for charging the battery pack through the portable device also is provided over a selected one of these conducting paths. These conducting paths and the current that flows through them are described in greater detail later herein. An auxiliary charger for operation of the portable unit or for charging the battery pack is connected either through an input/output connector 415 or through a barrel connector 420 on the portable device.

Figure 2:
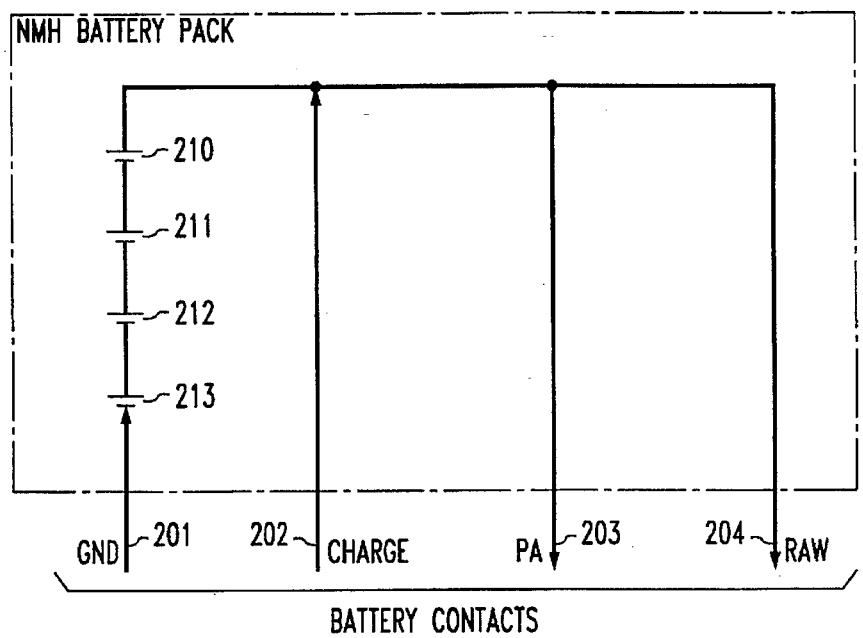
FIG. 2 shows a first battery pack and the voltages provided by this battery pack for operation of the portable device shown in FIG. 1.

Referring next to FIG. 2, there is shown the details of an embodiment of the battery pack 20 shown in FIG. 1, this embodiment being usable in providing operating power for the portable device 40. This battery pack employs, by way of example, nickel-metal hydride (NiMH) cells. As seen in this figure, four NiMH cells 210 through 213 are connected in series for providing the operating voltage to the portable device over battery contacts 201 through 204. In this battery pack 20, the charge contact 202, the power amplifier (PA) contact 203, and the RAW contact 204 are all commonly connected to the positive or anode side of the series connected cells 210 through 213. A common ground contact 201 connects to the cathode or negative side of the series connected cells 210 through 213. These contacts provide the following functions: 1) the RAW contact 204 provides the RAW battery output voltage to the portable device; 2) the power amplifier contact 203 provides a regulated voltage output to supply power to the power amplifier; 3) the charge contact 202 provides a path for charging the battery and; the ground contact 201 provides the ground return for the battery pack 20.

Figure 3:
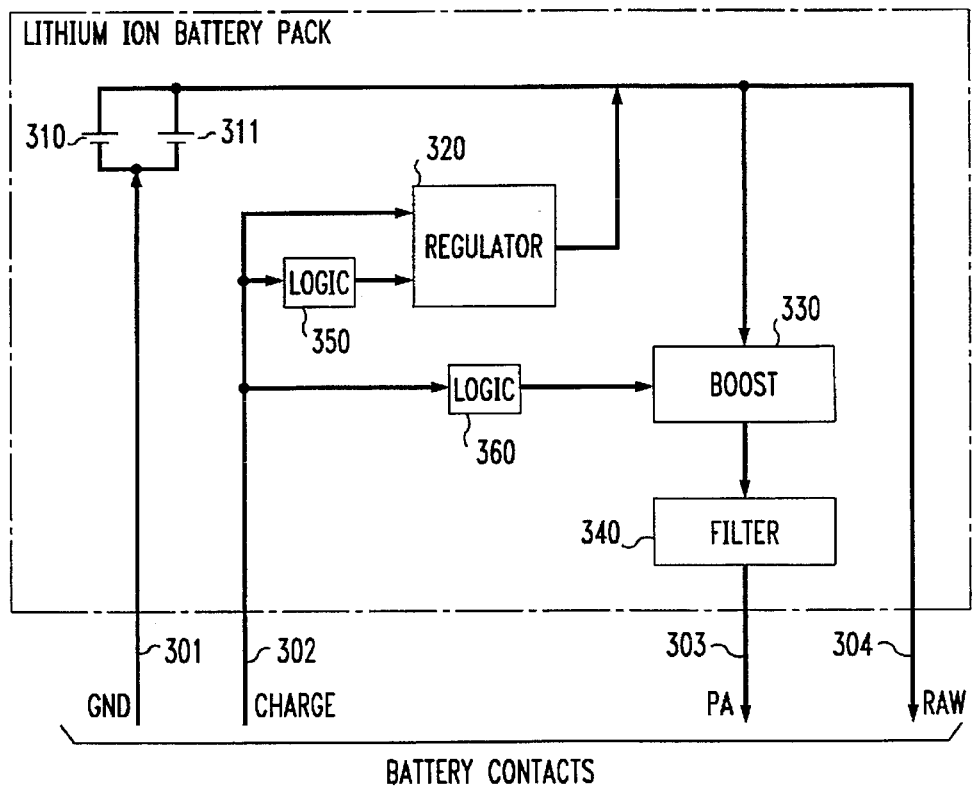
FIG. 3 shows a second battery pack and a high-level block diagram of interface circuitry in this second battery pack for operation of the portable device shown in FIG. 1, in accordance with the invention.

FIG. 3 shows, in high-level block diagram form, details of a battery pack 30 usable with the portable device 40 shown in FIG. 1. This second and alternative embodiment of a battery pack, however, employs lithium-ion cells, a radically different battery technology from the technology employed in the NiMH battery technology. This battery pack 30 also provides a user with extended talk and standby times when used in a portable device such as a cellular transceiver. The characteristics of lithium-ion cell are described in a sales brochure entitled *Lithium Ion Battery*, by the New Business Promotion Division of Hitachi Maxwell Ltd., 1995.

Contained in the battery pack 30 are two lithium-ion cells 310 and 311 connected in parallel, and interface circuitry which includes a regulator 320, a boost circuit 330, a filter 340 and logic circuits 350 and 360. The lithium-ion cells provide power to the portable device through battery pack contacts 301 through 304. These contacts 301 through 304 interface with the contacts 401 through 404 on the portable device 40. Although these contacts occupy the same physical position on battery pack 30 as contacts 201 through 204 occupy on battery pack 20, selected ones of these contacts have different functions and provide different voltage levels in order to properly interface the battery pack 30 to the portable device 40. For example, the power amplifier contact 303 in battery pack 30 provides a regulated voltage output to supply power to the power amplifier in the portable device, this voltage output being different from the RAW battery output obtained at the RAW battery contact 304. Also, through the charge contact from the portable device 40 is provided not only the charging current for the battery cells, but also a control signal which, in the absence of the charging current, is coupled to the logic circuit 360 and provides an ON/Off control for the power amplifier boost circuit 330. These circuits and their operation are described in greater detail later herein and with reference to FIG. 5.

Figure 4:
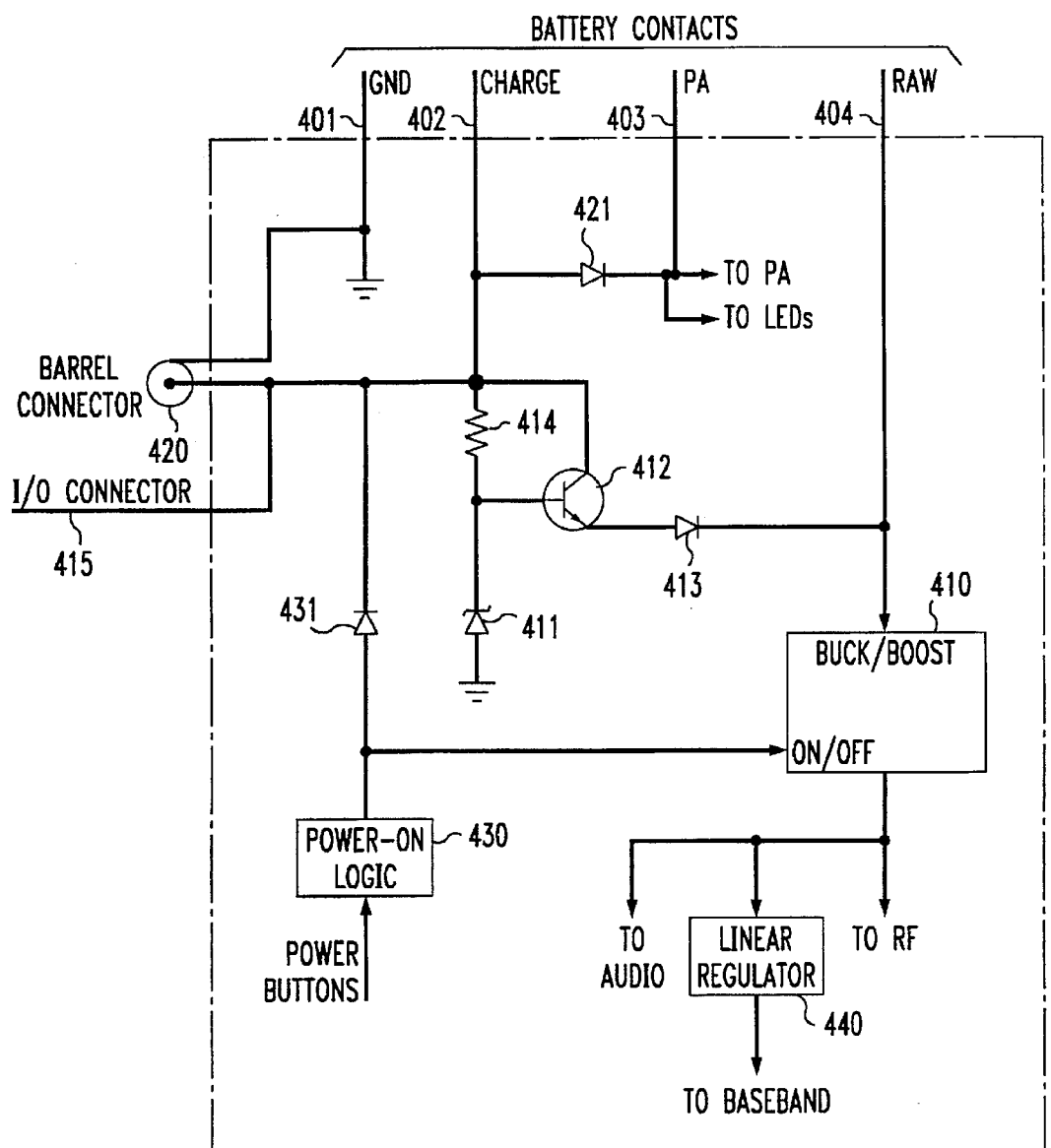
FIG. 4 shows interface circuitry in the portable device of FIG. 1 arranged for receiving operating power from a battery pack such as shown in FIGS. 1, 2 and 3 and also for receiving battery charging current for the battery pack from a charger, in accordance with the invention.

Referring now to FIG. 4, there is shown power interface circuitry in a portable device such as a cellular transceiver which illustrates the advantageous operation of the device with battery packs having cells from different battery technologies. Included in the circuitry is a buck/boost circuit 410. Such a circuit is available from Maxim Integrated Products, Inc. as Part No. MAX879. The buck/boost circuit 410 receives an input or operating voltage from one of three possible input voltage sources and either bucks (reduces) or boosts (increases) its output voltage for providing the appropriate voltage level to circuit sections in the portable device.

The first input voltage source for the buck/boost circuit 410 is the RAW battery voltage provided from an attached battery pack through the battery contact 404. This RAW battery voltage may be provided by, for example, either the nickel-metal hydride battery pack, described in FIG. 2, or the lithium-ion battery pack, described in FIG. 3.

The second input voltage source for the buck/boost circuit 410 is provided from a two-conductor barrel-type connector 420 located on the outer housing or shell of the portable device. The power specification for the barrel connector is 5.8 volts which sources 580 milliamps of current. Voltage for the barrel connector may be obtained either from a 12-volt source, in which case the 12-volt source is reduced to 5.8 volts, or from a 110-volt AC source which is rectified and reduced to the 5.8-volt source before being input into the barrel connector.

The third input voltage source for the buck/boost circuit 410 is over a lead provided via an I/O connector 415 associated with an external accessory, such as, for example, a hands-free car kit currently available from AT&T. The barrel connector 420 and the I/O connector 415 differ only in their input connections and the manner in which the source voltage is inputted. These two input connectors also have their outputs commonly connected together.

The barrel and I/O connectors are isolated from the RAW battery input source from the battery pack. Such isolation is provided because the input to the buck/boost circuit 410 for these connectors is commonly shared with the RAW battery voltage input from an attached battery pack. Thus, any undesirable voltage level reaching the buck/boost circuit 410 from the barrel and I/O connectors would also appear across the terminals of the battery pack then connected to the portable device and possibly have an adverse effect on the lithium-ion battery when a battery pack containing this type of cell is employed.

Such isolation of the barrel and I/O connectors from the RAW battery source to the buck/boost circuit 410 is advantageously provided by voltage limiting circuitry which includes a Zener diode 411, transistor 412, diode 413, and bias resistor 414. The bias resistor 414 provides bias current for the 5.1-volt Zener diode 411. This sets the base voltage of transistor 412 to 5.1 volts. The emitter of transistor 412 is therefore held at one diode drop below 5.1 volts. Diode 413 will conduct if the difference between the RAW voltage from a battery pack and the voltage on the base of transistor 412 is greater than or equal to two diode drops. Assuming that a diode drop is 0.7 volts, then diode 413 will conduct when the RAW voltage is less than or equal to 3.7 volts.

The voltage limiting circuitry also provides a path from the barrel connector voltage source and the I/O connector source to the buck/boost circuit 410 when a battery pack is not affixed to the portable device. This allows the portable device to be powered without a battery pack. When a battery pack is present, however, the voltage limiting circuitry limits the input voltage from the barrel or I/O connector appearing at the input to the buck/boost circuit 410 to a level that is safe for the lithium-ion battery.

In this power architecture, there are two voltage inputs that must be provided for the portable device—the RAW source which, as described above, is provided over the battery contact 404 to the buck/boost circuit 410, and also a source for the power amplifier and light emitting diodes (LEDs), which is provided over battery contact 403. The voltage necessary for providing the two voltage inputs for operation of the portable device also may be similarly obtained from either the barrel connector 420 or the I/O connector 415.

The output of the barrel connector and I/O connector sources, appearing on the charge input to the battery pack through battery contact 402, is isolated from the power amplifier source appearing on battery contact 403 to insure proper operation when lithium-ion cells are contained in the battery pack attached to the portable device. Diode 421 provides the isolation of the power amplifier source appearing on battery contact 403 from the charge input to the battery, which appears on battery contact 402. Diode 421 also provides a path from both the barrel connector and I/O connector to the power amplifier lead when a battery is not connected to the portable device. The use of diode 421 prevents a power-on logic signal (necessary for proper operation of the lithium-ion battery pack) from being continuously applied to circuitry in the lithium-ion battery pack. Without diode 421, this power-on logic signal initially provided from either the barrel or I/O connector source voltages or the power-on logic circuit 430 would otherwise be coupled through the charge lead, through the battery pack, back into the portable device through the power amplifier lead, and again into the lithium-ion battery pack whereby circuitry in the battery pack would be held in the ON position.

To control the turning ON/OFF of the power boost circuit 330 in the lithium battery pack 30, shown in FIG. 3, a signal is provided from the portable device 40 to this battery pack. To reduce the number of contacts required between the portable device and the battery pack, this signal is multiplexed onto the battery charge lead which passes through battery contact 402. When charge voltage is present via either the barrel connector 420 or the I/O connector 415, this voltage automatically activates the boost circuit 330 within the battery pack 30. If charge voltage is not present from the barrel connector or I/O connector, however, a power-on logic circuit 430 within the portable device can also activate the boost circuit 330 in the battery pack 30 via the charge lead. This power-on logic circuit 430 is activated by a person actuating a power button on the portable device. A diode 431 isolates the barrel and I/O connectors from this power-on logic circuit 430 and prevents a voltage at these connectors from turning on the buck/boost circuit 410 while allowing a voltage at the power-on logic circuit 430 to activate the boost circuit 330 within the battery pack 30.

The output of the buck/boost circuit 410 is coupled to various component sections in the portable device 40. For example, in the illustrated transceiver type portable device, the voltage from the buck/boost circuit 410 is coupled to an audio circuit section, a radio frequency (RF) section and to a baseband circuit section via a linear regulator 440.

Figure 5:
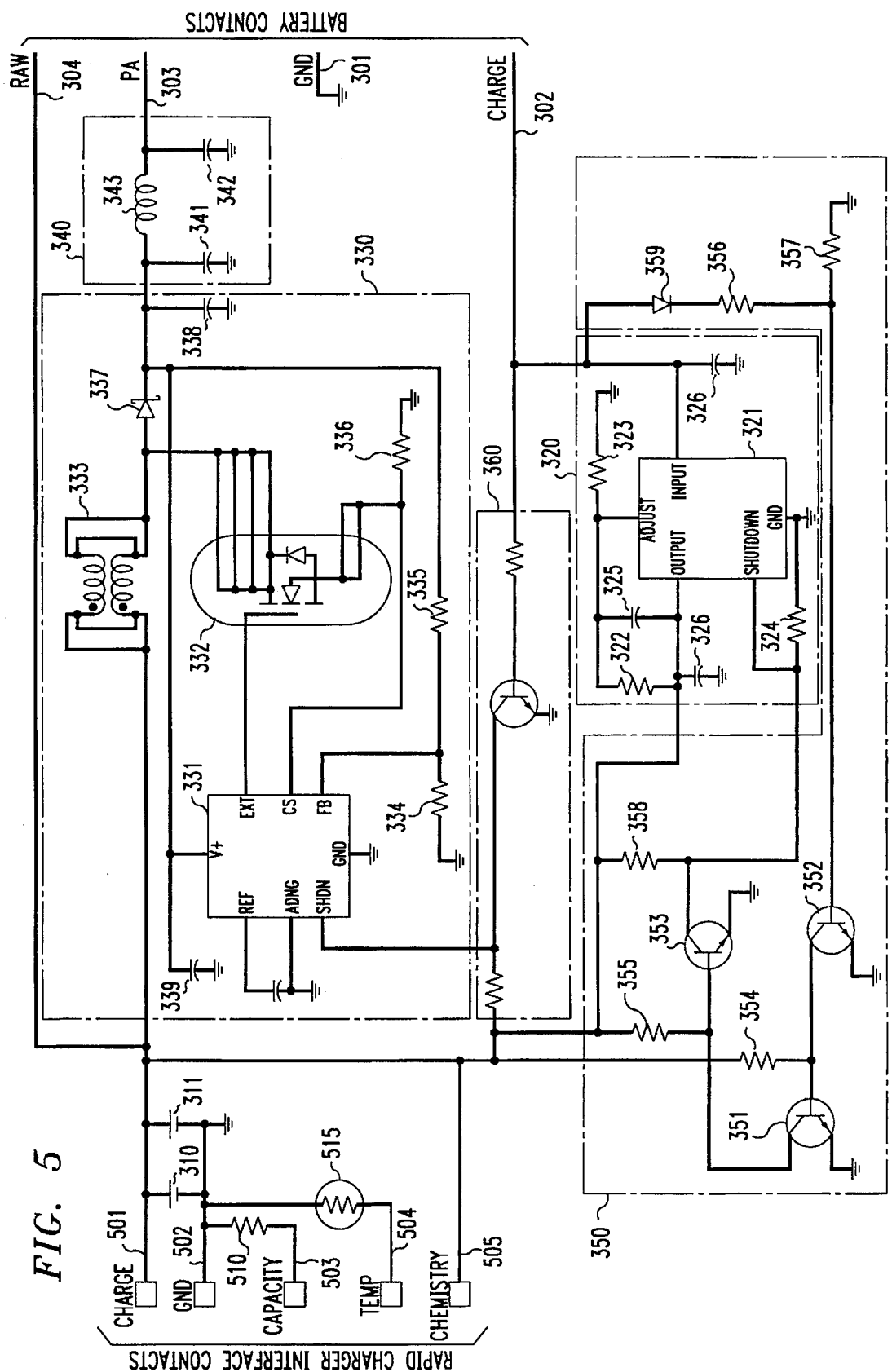
FIG. 5 shows details of the interface circuitry shown in the block diagram of FIG. 3, in accordance with the invention.

FIG. 5 shows the details of the lithium-ion battery pack 30 which is also shown in a high-level block diagram in FIG. 3. The battery pack contains essentially two primary circuits-the constant voltage charge or regulator circuit 320 and the DC-to-DC converter or boost circuit 330 and also supporting circuitry for these two circuits.

The regulator circuit 320 consists of a linear regulator 321, and associated circuitry which includes resistors 322 through 324, and capacitors 325 and 326. A linear regulator suitable for use as regulator 321 is commercially available from Micrel as Part No. MIC2941A. In the operation of the regulator 320, the lithium-ion battery cells 310 and 311 are charged to a voltage of 4.2 volts. These cells are charged with a constant current until the voltage of the cells is approximately 4.2 volts at which time the regulator 320 clamps the voltage at 4.2 volts. As this voltage is reached, also the battery takes less charge current, tapering down towards zero.

The boost circuit 330 provides a voltage level shift function and boosts the lower cell voltage lithium cells up from 4.2 volts to the nominal cell voltage of, for example, NiMH and NiCad cells which is 4.8 volts. The boost circuit 330 consists of a DC-to-DC converter circuit 331, transistor 332, transformer 333, resistors 334 through 336, a Zener diode 337 and capacitors 338 and 339. A circuit suitable for use as converter circuit 331 is commercially available from Maxim Integrated Products, Inc. as Part No. MAX770.

Supporting circuitry for the regulator circuit 320 and the boost circuit 330 are logic circuits 350 and 360 and also a filter circuit 340. The logic circuit 350 includes transistors 351 through 353, resistors 354 through 358 and diode 359. This logic circuit 350 determines whether charge current is present or absent on the charge battery contact 302 in order to open or close the charge path to the regulator 320. When charge current is not present, the charge path to the regulator 320 is opened.

The logic circuit 360 includes transistor 361 and resistors 362 and 363. This logic circuit enables or disables the boost circuit in response to either the presence of charge current or a signal from the portable device 40 provided over the charge battery contact 302. If charge current is present, the boost circuit is automatically turned on. If charge current is not present, however, the boost circuit 410 may still be turned on through the signal provided by the power-on logic circuit 430 in the portable device 40. When the battery is not installed on the portable device 40, there is no charge voltage present and the charge path is opened. In addition, at this time, the boost circuit is disabled.

The filter circuit 340 consists of a $\pi$ filter which includes capacitors 341 and 342 and an inductor 343. This filter removes switching noise generated by the boost circuit 330.

Also contained within the battery pack is an interface for a rapid charger which includes: 1) a charge contact 501, 2) a ground (GND) contact 502; 3) a capacity contact 503; 4) a temperature (TEMP) contact 504; and 5)a chemistry contact 505. This interface permits the battery pack to be inserted in and rapidly charged in an auxiliary charging cradle (not shown).

The charge contact 501 provides a connection to the anode (positive point) of the battery pack. It is through this contact that charging current is sourced into the battery. This contact also provides a means for the charging circuit to monitor the voltage level of the battery pack as a means for stopping the rapid charge process.

The ground contact 502 provides a connection between the charger and the cathode (negative point) of the battery pack. Charge current flowing into the battery pack anode is returned to the charger on this contact. This contact also provides a common reference point between the battery and charger.

The battery cells are charged through a constant current source that is preset to an appropriate current value for a particular battery pack. The auxiliary charger reads the basic battery characteristics through the capacity and chemistry contacts 503 and 505. The adjustable constant current source is set for a range of capacity sizes determined by the size of a resistor 510 installed between the capacity and ground contacts 503 and 502. The chemistry contact 505 provides information on chemistry of the battery cells, i.e., NiCad or NiMH which are similar or Li-ion, for example, and is tied to a particular potential level for providing this information to the charger. This information dictates how the auxiliary charger detects when to end the rapid charge portion of the charging cycle for a particular battery. For the Li-ion battery pack shown in FIG. 5, this chemistry contact 505 is tied to the positive potential of the battery.

The temperature contact 504 provides an indication of the temperature of the battery pack and is used to halt the rapid charge process. In order to measure this temperature, a thermistor 515 is inserted between the temperature contact 504 and the ground contact 502. As the battery pack temperature increases, the resistance of the thermistor decreases. If the battery temperature is not within a predefined range, rapid charging does not commence until the temperature is acceptable.

While the foregoing invention has been described in terms of the above-detailed embodiments, it will be readily apparent to those skilled in the art that various modifications can be made. Accordingly, such modifications are contemplated as being within the knowledge of one skilled in the art and may be utilized without departing from the spirit and scope of the claimed invention.

We claim:

1. An arrangement for accommodating each one of a plurality of battery types in a portable device, the arrangement comprising:

a first interface means in said portable device configured for receiving operating power for said portable device from a first battery type at a voltage output level suitable for operating said portable device; and a second interface means associated with a second battery type, said second interface means being positioned between said first interface means and said second battery type for adjusting the voltage output level available from said second battery type to a level suitable for operating said portable device.

2. The arrangement of claim 1 wherein each of the plurality of battery types are enclosed in similarly configured battery pack housings with commonly positioned electrical contacts thereon.

3. The arrangement of claim 1 wherein said second interface means includes means for adjusting the voltage output level from said second battery type to a plurality of voltage output levels suitable for operating said portable device.

4. The arrangement of claim 3 wherein said second interface means includes a boost circuit for increasing the level of at least one of said plurality of voltage output levels provided to said portable device from said second battery type.

5. The arrangement of claim 4 wherein said first interface means includes control circuitry for activating and deactivating said boost circuit.

6. An arrangement for accommodating each one of a plurality of battery types in a portable device, the arrangement comprising:

a first interface means in said portable device configured for receiving operating power for said portable device from at least a first battery type and a second battery type, said first interface means also being configured for receiving operating power for said portable device from an input voltage source, said first interface means including isolation means for isolating the operating power for said portable device received from said battery type from the operating power for said portable device received from the input voltage source;

battery charge circuit means in said first interface means for obtaining charging current from said input voltage source for charging said first and second battery types at a level suitable for charging said first battery type; and a second interface means associated with said second battery type for adjusting the level of said charging current to a level suitable for charging said second battery type.

7. The arrangement of claim 6 wherein each of the plurality of battery types are enclosed in similarly configured battery pack housings with commonly positioned electrical contacts thereon.

8. The arrangement of claim 7 wherein said electrical contacts on each of said battery pack housings are arranged for mating with electrical contacts in a hollow recess of the portable unit.

9. The arrangement of claim 8 wherein a battery pack housing is brought into electrical contact with the portable unit by placing the battery pack housing in said hollow recess of the portable unit.

10. The arrangement of claim 6 wherein said isolation means includes a first and a second diode.

11. The arrangement of claim 6 wherein said second interface means includes a regulator circuit for controlling the charging rate of said second battery type.

12. The arrangement of claim 11 wherein said second interface means further includes a logic circuit for sensing when charging current is available for charging the second battery type.

13. The arrangement of claim 6 wherein said input voltage source is provided by a barrel connector.

14. The arrangement of claim 6 wherein said input voltage source is provided by an input/output connector.

15. A method of accommodating each one of a plurality of battery types in a portable device, the method comprising the steps of:

configuring first interface circuitry in said portable device for receiving operating power for said portable device from a first battery type at a voltage output level suitable for operating said portable device;

configuring second interface circuitry associated with a second battery type for adjusting the voltage output level available from said second battery type to a level suitable for operating said portable device; and positioning said second interface circuitry between said first interface circuitry and said second battery type.

16. The method of claim 15 including the step of enclosing in similarly configured battery pack housings each of the plurality of battery types with commonly positioned electrical contacts thereon.

17. The method of claim 15 including the step of adjusting the voltage output level from said second battery type to a plurality of voltage output levels suitable for operating said portable device.

18. A method of accommodating each one of a plurality of battery types in a portable device, the method comprising the steps of:

configuring a first interface circuit in said portable device for receiving operating power from at least a first battery type and a second battery type for said portable device, configuring said first interface circuit for receiving operating power for said portable device from an input voltage source;

isolating the operating power for said portable device received from said battery type from the operating power for said portable device received from the input voltage source;

obtaining charging current in said interface circuit from said input voltage source for charging said first and second battery types at a level suitable for charging said first battery type; and adjusting in a second interface circuit the level of said charging current to a level suitable for charging said second battery type, said second interface circuit being associated with said second battery type.

19. The method of claim 18 including the step of enclosing in similarly configured battery pack housings each of the plurality of battery types with commonly positioned electrical contacts thereon.

20. The method of claim 19 including the step of arranging said electrical contacts on each of said battery pack housings for mating with electrical contacts in a hollow recess of the portable unit.

21. The method of claim 20 including the step of bringing into electrical contact a battery pack housing with the portable unit by placing the battery pack housing in said hollow recess of the portable unit.

22. The method of claim 18 wherein said input voltage source is provided by a barrel connector.

23. The method of claim 18 wherein said input voltage source is provided by an input/output connector.

* * * * *